United States Patent
Mueller et al.

(10) Patent No.: US 6,319,992 B1
(45) Date of Patent: Nov. 20, 2001

(54) PRESSURE SENSITIVE ADHESIVE DISPERSION OF A COPOLYMER OF BUTYLACRYLATE AND (METH) ACRYLIC ACID

(75) Inventors: Gunther Mueller, Gernsheim; Herbert Fink, Bickenbach; Joachim Heyne, Limburgerhof, all of (DE)

(73) Assignee: Roehm GmbH Chemische Fabrik, Darmstadt (DE)

( * ) Notice: Subject to any disclaimer, the term of this patent is extended or adjusted under 35 U.S.C. 154(b) by 1366 days.

(21) Appl. No.: 08/656,871

(22) Filed: May 30, 1996

Related U.S. Application Data

(62) Division of application No. 08/296,244, filed on Aug. 25, 1994, now Pat. No. 5,556,922.

(30) Foreign Application Priority Data

Sep. 21, 1993 (DE) ................................................ 43 32 012

(51) Int. Cl.$^7$ .................................................... C08F 265/09
(52) U.S. Cl. ............................................ 525/301; 525/902
(58) Field of Search ...................................... 525/301, 902

(56) References Cited

U.S. PATENT DOCUMENTS

| | | | |
|---|---|---|---|
| 4,385,152 | * | 5/1983 | Boyack ................................ 525/301 |
| 4,391,928 | * | 7/1983 | Herman . |
| 4,427,836 | * | 1/1984 | Kowalski ............................ 525/301 |
| 4,683,269 | * | 7/1987 | Aksman . |

* cited by examiner

*Primary Examiner*—Christopher Henderson
(74) *Attorney, Agent, or Firm*—Oblon, Spivak, McClelland, Maier & Neustadt, P.C.

(57) ABSTRACT

A method for preparing a dispersion for a pressure sensitive adhesive is provided, wherein the dispersions contain a copolymer (CP) having units of butyl acrylate and meth) acrylic acid; the method involving the steps of polymerizing an aqueous emulsion (EM) containing butyl acrylate, an anionic emulsifier and a non-ionic emulsifier, in the aqueous phase, under heating and in the presence of at least one water-soluble initiator (IN) of formula (I)

$$MR_1 \qquad (I)$$

where M represents a metal cation, and

R1 represents an anion of a peroxyacid or azo-group-containing acid, wherein (IN) is present in an amount of 0.5–1.5 wt. % (based on weight of the monomers);

emulsifying-in (meth)acrylic acid while maintaining an elevated reaction temperature; and adding a second initiator (RI) to complete the polymerization.

10 Claims, No Drawings

PRESSURE SENSITIVE ADHESIVE DISPERSION OF A COPOLYMER OF BUTYLACRYLATE AND (METH) ACRYLIC ACID

This is a Division, of application Ser. No. 08/296,244 filed on Aug. 25 1994 now U.S. Pat. No. 5,556,922.

BACKGROUND OF THE INVENTION

1. Field of the Invention

The present invention relates to methods for preparing aqueous dispersions comprising alkyl (meth)acrylates which are suitable as pressure sensitive adhesives.

2. Description of the Background Art:

Pressure sensitive adhesives (also known as "self-adhesive compounds") form a permanently adhesive film which, under slight pressure, adheres immediately to various surfaces at room temperature. (See 1985, "Ullmann's Encyclopedia of Industrial Chemistry", 5th Ed., Vol. A1, pub. VCH, pp. 235–236.)

Pressure sensitive adhesives are used principally for coating of supports, such as those based on paper or polymer films or sheets. These coated supports provide products such as self-stick labels, adhesive tapes and self-stick film which have a characteristic broad spectrum of properties, including:
short-contact-time adhesion of the adhesive film to the substrate surface ("tack") and
water-resistance of the adhesive layer.

Understandably, a single pressure sensitive adhesive cannot display all desirable properties, particularly those properties which are mutually exclusive. Accordingly, a compromise must be made and an "optimized" set of properties must be found for each application. Often, product optimization is accomplished by the use of various auxiliary substances, such as synthetic resins, tackifiers, crosslinking agents and viscosity regulators. The particular adhesives, depending on their compositions, are applied to the substrates in the form of solutions, dispersions, or even melts. After the adhesive sets, the layer of pressure sensitive adhesive is present as a film on the support. Prior to use, the film is often covered, with a suitable anti-adhesive material, such as a silicone-based film. However, adhesive tapes may also be employed with no covering layer (see "Ullmann's Encyclopedia", loc.cit., 258). Natural and synthetic rubbers, in modified form, may be used as adhesive materials for pressure sensitive adhesives. Also frequently used are adhesives prepared from poly(meth)acrylic acid esters, polyvinyl ethers, and polyisobutylene, often in combination with phenolformaldehyde-or hydrocarbon resins.

Polyacrylate dispersions or vinyl acetate copolymers are also often used as so-called "dispersion pressure sensitive adhesives", to which resins are often added.

The problem with most pressure sensitive adhesives can be better understood by way of an illustrative example based on adhesive tapes made of (corona treated) polypropylene strip material. Such adhesive tapes are often used as packaging tape for cardboard boxes. The most important requirements in this area of application are for good adhesion of the tape to the surface of the box, and good internal strength (or cohesion) of the adhesive layer. In most cases, it has not been possible to satisfy both of these requirements simultaneously, because many of the means of producing good cohesion are detrimental to good adhesion. For example, while it is known that cohesion increases with increasing molecular weight of the polymer, adhesion decreases correspondingly.

In Ullmann, loc.cit., it is stated:
"There are indications that a pressure sensitive adhesive must always be comprised of
a high polymer principal resin, which contributes cohesion and the specific adhesion, and
so-called tackifiers, wherewith in many systems the latter may be replaced by low molecular weight components of the principal polymer. To increase cohesion, in many systems the principal resin is crosslinked (or vulcanized, in the case of rubbers) after application."

Certain techniques for preparing the adhesive by emulsion polymerization have found favor, despite the fact that a number of variants are known. Thus, the use of ammonium peroxydisulfate (APS) as an initiator has become standard procedure. Conventionally peroxydisulfate compounds are used as initiators in amounts of 0.001–0.05 wt. % (based on the weight of the monomers) (see Houben and Weyl, 1961, "Methoden der Organischen Chemie", 4th Ed., Vol XIV/1, pub. G. Thieme, p. 1049; and 1968, Rauch-Puntigam, H. and Voelker, Th., "Acryl- und Methacrylvergindungen", pub. Springer-Verlag, 221).

Thus, it is desired in the art to improve the overall set of properties of the known acrylate pressure sensitive adhesives, particularly their adhesion and cohesion, without requiring the use of auxiliary additives as noted above.

SUMMARY OF THE INVENTION

Accordingly, one object of the present invention is to provide a method for preparing a pressure sensitive adhesive composition which has both high adhesion and high cohesion.

A further object of the present invention is to provide a pressure sensitive adhesive prepared by the method of the present invention, in which the adhesive composition has both good adhesion and good cohesion.

A further object of the present invention is to provide a method for preparing a pressure sensitive adhesive having both high adhesion and high cohesion, without the use of conventional auxiliary additives to provide such adhesion and cohesion.

These and other objects of the present invention have been satisfied by the discovery that dispersions for pressure sensitive adhesives can be prepared by a method for preparing a dispersion, wherein the dispersions comprise a copolymer (CP) comprised of units of n-butyl acrylate and (meth)acrylic acid; the method comprising the steps of polymerizing an aqueous emulsion (EM) containing butyl acrylate, an anionic emulsifier and a non-ionic emulsifier, in the aqueous phase, under heating and in the presence of at least one water-soluble initiator (IN) of formula (I)

$$M\ R_1 \qquad (I)$$

where M represents a metal cation, and
R1 represents an anion of a peroxyacid or azo-group-containing acid,
wherein said (IN) is present in an amount of 0.5–1.5 wt. % (based on weight of the monomers);
emulsifying-in (meth)acrylic acid while maintaining an elevated reaction temperature; and
adding a second initiator (RI) to complete the polymerization.

DETAILED DESCRIPTION OF THE PREFERRED EMBODIMENTS

The starting point for the present invention is a principal resin comprised of butyl acrylate in combination with relatively small amounts (<15 wt. %) of (meth)acrylic acid.

The present invention relates to a method of producing dispersions for pressure sensitive adhesives, which dispersions are based on a copolymer CP comprised of units of n-butyl acrylate and small amounts of (meth)acrylic acid, wherewith, in a first step, butyl acrylate is polymerized, preferably as a core, in aqueous phase preferably under the conditions of a core and shell polymerization, in the presence of water-soluble initiators IN of formula I

M R$_1$ (I)

where M represents a metal cation such as sodium or potassium, and

R1 represents the anion of a peroxyacid or azo-group-containing acid, which initiators are present in the amount of 1±0.5 wt. % (based on the weight of the aqueous phase); and in a second step butyl acrylate and (meth)acrylic acid are polymerized, in an overall ratio in the range 99.5:0.5 to 90:10 in terms of parts by weight (pbw), preferably 98:2 to 96:4 in terms of pbw, wherewith the (weight) ratio of core to shell is preferably in the range 30:70 to 70:30, particularly preferably 50:50, and the polymerization is carried out to completion, wherewith preferably at the end of the polymerization the (meth)acrylic acid groups are neutralized with ammonia (neutralization pH 9.5). The procedure is performed according to customary methods of emulsion polymerization, such as in a semicontinuous "feed" process or in a batch process (see Houben and Weyl, loc.cit., Vol. XIV/I).

According to the present invention, the internal strength of the adhesive layer can be increased by copolymerization with various crosslinking agent systems in various concentrations (one might mention, e.g., allyl (meth)acrylate, ethylene glycol dimethacrylate, methacrylamide, N-(hydroxymethyl) methacrylamide, and triallyl cyanurate) (see 1968, Rauch-Puntigam, H. and Voelker, Th., loc.cit.). However, systems crosslinked in this way ordinarily have low adhesion, and the adhesion is not increased to a significant degree by regulating molecular weight in the emulsion polymerization.

When the method of the present invention is used, however, the required set of properties—very good cohesion along with excellent adhesion—can be surprisingly achieved in n-butylacrylate (meth)acrylic acid-based polymers produced by emulsion polymerization, if one employs special water-soluble initiators IN in amounts which are very large compared with the concentrations customarily used.

In accordance with the present invention, the desired set of properties for pressure sensitive adhesive films is fully realized only if the dispersions for the pressure sensitive adhesives are polymerized by the method of core and shell polymerization. (While the method employed according to the invention will be designated a "core and shell" method, This designation is not meant to limit the present invention to an ideal core-shell polymer but can also include structures with only partial "shells" on the "core" portion also. Further, there is no need to accept as given certain model concepts associated therewith.) In the core and shell polymerization, the core will be comprised of butyl acrylate. If one tries homogeneous incorporation of (meth)acrylic acid or a variation of the core and shell conditions, the result is usually a major deterioration of temperature resistance of the final polymer.

The initiators IN are, per se, known compounds (see Brandrup, J., and Immergut, E. H., 1989, "Polymer Handbook", 3rd Ed, Vol. II-1, pub. J. Wiley). The initiators IN include azo compounds, which may preferably be selected from among azo compounds represented by formula I-A

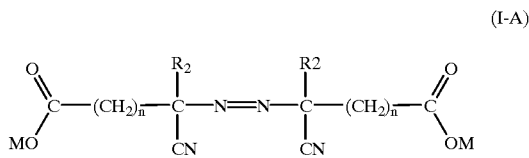

where R2 represents CH$_3$, and n represents a number from 1 to 4.

Most preferably, the initiators IN of formula I are selected from the group consisting of metal salts of peroxydisulfuric acid, such as potassium peroxydisulfate (KPS), sodium peroxydisulfate (NaPS), and the metal salts (e.g. K or Na salt) of 4,4'-azobis-(4-cyanovaleric acid). However, the conventionally used ammonium salts should not be used. The final polymerization may advantageously be promoted by addition of a redox initiator RI. Suitable redox initiators include those listed in "Kirk-Othmer Encyclopedia of Chemical Technology" Vol. 13, pp. 355–373 (1981), which is hereby incorporated by reference, with the redox initiators tert-butyl hydroperoxide/ferrous sulfate and tert-butyl hydroperoxide/sodium hydroxymethylsulfinate being preferred.

Based on available knowledge, homogeneous incorporation of the (meth)acrylic acid and appreciable variation of the core/shell ratio beyond the range stated leads to a substantial decrease in temperature resistance of the adhesive. If the (meth)acrylic acid groups are neutralized by ammonia at the end of the polymerization, the processibility of the dispersion (shear stability) and its application characteristics (film formation) are improved. Determination of the acid distribution in the dispersions shows a relatively large proportion of acid-group-containing oligomers ($M_w \leq 400$ g/mol) in the serum, which oligomers form in the aqueous phase as a result of the large amount and reactivity of the starting radicals (oligomer radicals). While the present inventors do not wish to be limited by the following hypothesis, the inventors propose that the increased content of acid group-containing oligomers in the serum of the dispersion is responsible for the observed major increase in the adhesion of the polymer film, somewhat in the manner of a tackifier.

The pressure sensitive adhesives of the present invention are produced by the method of emulsion polymerization, which is, per se, known (see Houben and Weyl, 1987, loc.cit., Vol. E20, pp. 1150–1156; 1992, "Ullmann's", loc.cit., Vol. 21 A; and Rauch-Puntigam and Voelker, 1967, loc.cit., pp. 217–230).

While the general course employed in the method relies on the state of the art, the particular steps performed provide a novel result. Particularly, surface-active substances with an HLB (hydrophilic-lipophilic balance) value >12 are used as emulsifiers; these surface active substances include anionic emulsifiers such as sulfates and sulfonates of oligoglycol ethers, and particularly non-ionic emulsifiers such as oxyethylation products of alkylphenols and alkanols having 12–20 C. atoms. Examples of anionic emulsifiers which might be mentioned are sulfosuccinic acid esters, which are effective at pH values below the neutral point.

Specifically, a preferred embodiment of the present method can be performed as follows:

To a reaction vessel equipped with a stirring apparatus, temperature control means, and dosing means are changed completely desalinated water (comprising c. 35% of the aqueous phase), an emulsifier (such as c. 0.03% of a sulfosuccinic acid ester), and an acrylate-based seed latex (having particle diameter of 50 nm for example).

The mixture thus charged is heated to 80° C., and c. 10 wt. % of the total amount of initiator (neutralized with a suitable alkali, such as sodium hydrogen carbonate, and dissolved in approximately twice the amount of water) is added.

To this solution is added, portionwise, over a few hours at the chosen temperature, generally from 50 to 120° C., preferably from 65 to 90° C., under stirring, an emulsion of butyl acrylate in desalinated water, which emulsion contains the non-ionic surfactant as well as the anionic emulsifier (in a preferred weight ratio of the surfactant to the emulsifier of c. 1:4).

The emulsion, which may contain butyl acrylate and water in a ratio of c. 2:1 by weight, also preferably contains c. 0.5 wt. % of an initiator IN of formula I, neutralized with a suitable alkali hydrogen carbonate.

After about half of the feed time, the (meth)acrylic acid is emulsified-in, without interrupting the feed.

Preferably, the reaction mixture is held at elevated temperature (generally the same temperature used for the initial polymerization step) for the desired period, such as 1 hr, and then is allowed to cool to room temperature.

The final polymerization may then be carried out at a slightly lower temperature, generally less than or equal to 70° C., preferably with the addition of a redox initiator RI, such as tert-butyl hydroperoxide/ferrous sulfate or tert-butyl hydroperoxide/sodium hydroxymethylsulfinate.

Finally, defoamants such as a hydrocarbon-fat emulsion are added, and the pH adjusted to alkaline (pH 9.5±0.5) with ammonia.

The resulting dispersions for pressure sensitive adhesives are then applied in simple fashion to the desired substrate (support), such as the above-mentioned (corona-treated) polypropylene strip material. Application of the disperser made to the support by any conventional method, such as may be, by means of a doctor blade method, at a thickness such that after evaporation of the water and film formation the film weight of the remaining pressure sensitive adhesive layer is in the range 20–30 g/sq m.

The adhesive films produced by the dispersions of the present invention show very good adhesion as well as good temperature resistance, in technical tests. It should be noted that the present adhesive dispersions produce adhesive films with good adhesion and thermal resistance solely on the basis of the production method of the present invention, and without addition of tackifiers or condensation resins.

Having generally described this invention, a further understanding can be obtained by reference to certain specific examples which are provided herein for purposes of illustration only and are not intended to be limiting unless otherwise specified.

EXAMPLES

Adhesion was measured by Test Method No. 1 of the PSTC (Pressure Sensitive Tape Council).

The cohesion of the adhesive films was characterized by measuring the temperature resistance (PSTC Test Method No. 7).

The "tack" was determined by PSTC Test No. 6 (see PSTC, "Test Methods for Pressure sensitive Tapes", 9th Ed.).

A. Production of the Adhesive Dispersions

Example 1

11.22 kg desalinated water, 0.0033 kg diisohexyl sulfosuccinate (Rewopol® SB MB 80), and 0.042 kg of an acrylate-based seed latex (particle diameter 50 nm) were heated to 80° C. in a reaction vessel equipped with a stirrer, temperature control means, and a dosing device. At this temperature, 0.028 kg initiator (4,4'azobis-(4cyanovaleric acid) dissolved in 0.052 kg water and neutralized with 0.018 kg NAHCO$_3$) was added. To this solution an emulsion produced from the following components was added portionwise at 80° C. under stirring, over a period of 4 hr:

- 41.16 kg butyl acrylate
- 20.04 kg desalinated water
- 0.175 kg diisohexyl sulfosuccinate
- 0.175 kg 25% aqueous solution of a nonionic surfactant (Marlipal® 013/400) (a C$_{13}$ keto alcohol with 40 mol ethylene oxide)
- 2.1 kg 4,4'-azobis-(4-cyanovaleric acid) ("azo") solution, comprised of 0.21 kg "azo", 1.89 kg water, and 0.135 kg NaHCO$_3$.

After 2 hr of the portionwise feed of the emulsion, 0.84 kg methacrylic acid was emulsified-in without interruption of the feed. After completion of the feed, the reaction mixture was maintained at 80° C. for an additional 1 hr and then was cooled to room temperature. During this cooling, the final polymerization was carried out at 70° C. by addition of 0.035 kg tert-butyl hydroperoxide, 0.0003 kg ferrous sulfate, and 0.028 kg sodium hydroxymethylsulfinate. 0.011 kg defoamant (Nopco® NXZ, a hydrocarbon/fat emulsion) was added at 40° C., and the pH was adjusted with ammonia.

Standard Characteristics of the Dispersions for Pressure Sensitive Adhesives

| | |
|---|---|
| Solids content (%) | 53 ± 1 |
| Viscosity (mPa-sec) | 100–600 |
| Particle radius, r$_{NS}$ (nm), measured with a Nanosizer® by photocorrelation microscopy | 250 ± 50 |
| pH | 9.5 ± 0.5. |

The following Table reports on other Examples analogous to Example 1, wherein the polymer composition was the same and the dispersions for pressure sensitive adhesives differed only as shown in the initiator system or the amount of initiator used.

TABLE

| Example No. | Initiator, IN (wt. %, based on the weight of the water phase) | Adhesion (N/25 mm), measured by PSTC Test Method No. 1 | Temperature resistance (hr), measured by PSTC Test Method No. 7 | Tack (mm), measured by PSTC Test Method No. 6 |
|---|---|---|---|---|
| 2. | 0.75% "Azo" (NaHCO$_3$) is * | 7.0 | >170 | 70 |
| 3. | 1.0% "Azo" (NaHCO$_3$) | 7.1 | >170 | 90 |
| 4. | 1% KPS, potassium peroxydisulfate | 8.3 | >120 | 90 |
| 5. | 0.75% KPS | 7.5 | >100 | 60 |
| 6. | 1% NaPS, sodium peroxydisulfate | 8.3 | >100 | |
| 7. | 0.35% "Azo" (NaHCO$_3$) + 0.5% KPS | 8.5 | >170 | 20 |
| 8. | 0.25% "Azo" (NaHCO$_3$) | 5.2 | <10 | |

TABLE-continued

| Example No. | Initiator, IN (wt. %, based on the weight of the water phase) | Adhesion (N/25 mm), measured by PSTC Test Method No. 1 | Temperature resistance (hr), measured by PSTC Test Method No. 7 | Tack (mm), measured by PSTC Test Method No. 6 |
|---|---|---|---|---|
| 9. | 1% APS, ammonium peroxydisulfate | 9.5 | <2 | 60 |
| 10. | 1% "Azo" (NH$_4$HCO$_3$) | 7.1 | <1 | |

*) 4,4'-azobis-(4-cyanovaleric acid) neutralized with NaHCO$_3$

As seen from the above Table, the adhesive films of the present invention have the desired set of properties (high adhesion and high temperature resistance) when metal-salt-containing initiators are used in sufficient amounts in producing the dispersions. When the corresponding ammonium-neutralized form of the initiator (such as APS) is used for the polymerization, the temperature stability (i.e. cohesion) is greatly reduced. If the amount of initiator is reduced substantially (e.g. 4,4'-azobis-(4-cyano valeric acid) in the amount of 0.25%, neutralized with NaHCO$_3$)' the adhesive film produced has unacceptably poor properties.

What is claimed as new and desired to be secured by Letters Patent of the United States is:

1. A pressure sensitive adhesive comprising a dispersion containing a copolymer (CP) comprised of units of butyl acrylate and (meth)acrylic acid, said method consisting essentially of:

under semi-continuous or batch polymerization conditions, polymerizing an aqueous emulsion (EM) containing butyl acrylate, an anionic emulsifier and a non-ionic emulsifier, in the aqueous phase, under heating and in the presence of at least one water-soluble initiator (IN) of formula (I)

$$MR_1 \tag{I}$$

where M represents an alkali metal cation, and

R$_1$ represents an anion of a peroxyacid or azo-group-containing acid, wherein said (IN) is present in an amount of 0.5–1.5 wt. % based on weight of the monomers;

emulsifying-in (meth)acrylic acid while maintaining an elevated reaction temperature such that the ratio of butyl acrylate to (meth)acrylic acid ranges from 99.5:0.5 to 90:10 parts by wt.; and adding a second initiator (RI) to complete the polymerization and wherein said process is carried out under conditions of core and shell polymerization.

2. The pressure sensitive adhesive of claim 1, wherein said core and shell are present in a weight ratio of from 30:70 to 70:30, respectively.

3. The pressure sensitive adhesive of claim 1, wherein said core is comprised of units of n-butyl acrylate.

4. The pressure sensitive adhesive of claim 1, wherein said initiator IN is a member selected from the group consisting of potassium- and sodium peroxydisulfate and the azo compounds represented by formula I-A

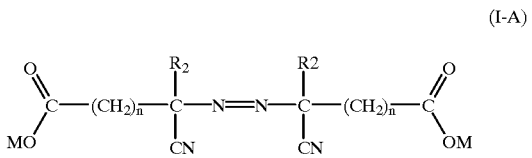

where R$_2$ represents a methyl group,

M represents a metal cation, and n represents a number from 1 to 4.

5. The pressure sensitive adhesive of claim 1, wherein said compound of formula (I-A) is a sodium- or potassium salt of 4,4'-azobis-(4-cyanovaleric acid).

6. The pressure sensitive adhesive of claim 1, wherein said compound of formula (I) is a potassium- or sodium salt of peroxydisulfuric acid.

7. The pressure sensitive adhesive of claim 1, wherein said non-ionic emulsifiers are addition products of ethylene oxide to keto alcohols or to alkylphenols.

8. The pressure sensitive adhesive of claim 1, wherein said anionic emulsifiers are sulfosuccinic acid esters.

9. The pressure sensitive adhesive of claim 1, wherein said second initiator (RI) is a member selected from the group consisting of tert-butyl hydroperoxide/ferrous sulfate and tert-butyl hydroperoxide/sodium hydroxymethylsulfinate.

10. The pressure sensitive adhesive of claim 1, wherein said anionic emulsifier is diisohexyl sulfosuccinate, said non-ionic emulsifier is a C$_{13}$ keto alcohol with ethylene oxide and said initiator is 4,4-azobis-(4-cyanovaleric acid).

* * * * *